United States Patent
Woo et al.

(10) Patent No.: US 9,165,491 B2
(45) Date of Patent: Oct. 20, 2015

(54) DISPLAY DEVICE HAVING MULTIPLE VIEWING ZONES AND CONVERTING HORIZONTALLY-ARRANGED RGB SUBPIXEL DATA FOR OUTPUT ON SQUARE-SHAPED VERTICALLY-ARRANGED RGB SUBPIXELS

(75) Inventors: Jong-Hoon Woo, Bucheon-si (KR); Young-Bok Lee, Gunpo-si (KR)

(73) Assignee: LG Display Co., Ltd., Seoul (KR)

( * ) Notice: Subject to any disclaimer, the term of this patent is extended or adjusted under 35 U.S.C. 154(b) by 674 days.

(21) Appl. No.: 12/285,874

(22) Filed: Oct. 15, 2008

(65) Prior Publication Data

US 2009/0140950 A1    Jun. 4, 2009

(30) Foreign Application Priority Data

Nov. 29, 2007    (KR) .................. 10-2007-0122787

(51) Int. Cl.
  *G09G 3/20*    (2006.01)
  *G09G 3/00*    (2006.01)
  *G09G 3/36*    (2006.01)
  *G02B 27/22*    (2006.01)
  *H04N 13/04*    (2006.01)

(52) U.S. Cl.
  CPC .............. *G09G 3/20* (2013.01); *G02B 27/2214* (2013.01); *G09G 3/003* (2013.01); *G09G 3/3607* (2013.01); *H04N 13/0404* (2013.01); *H04N 13/0409* (2013.01); *H04N 13/0422* (2013.01); *H04N 13/0447* (2013.01); *G09G 2300/0452* (2013.01); *G09G 2320/028* (2013.01)

(58) Field of Classification Search
  CPC ......... H04N 7/0135–7/0147; H04N 19/00066; H04N 13/0402–13/0497; G06T 3/4007; G06T 3/40; G09G 2340/0407–2340/0435; G09G 2340/04; G09G 2340/10; G09G 3/2074; G09G 3/3607; G09G 3/364
  USPC .......................... 345/4–6, 30–104, 694–696
  See application file for complete search history.

(56) References Cited

U.S. PATENT DOCUMENTS

| | | | | |
|---|---|---|---|---|
| 4,610,509 A | * | 9/1986 | Sorimachi et al. | 349/106 |
| 4,716,403 A | * | 12/1987 | Morozumi | 345/88 |
| 5,043,917 A | * | 8/1991 | Okamoto | 345/550 |
| 5,122,783 A | * | 6/1992 | Bassetti, Jr. | 345/88 |
| 5,473,381 A | * | 12/1995 | Lee | 348/441 |
| 5,491,769 A | * | 2/1996 | Moller | 345/670 |
| 5,675,489 A | * | 10/1997 | Pomerleau | 701/28 |
| 5,677,738 A | * | 10/1997 | Mizutani et al. | 348/458 |
| 5,850,269 A | * | 12/1998 | Kim | 349/15 |
| 6,016,370 A | * | 1/2000 | Hatakeyama et al. | 382/299 |
| 6,118,429 A | * | 9/2000 | Kasai et al. | 345/428 |

(Continued)

FOREIGN PATENT DOCUMENTS

| | | |
|---|---|---|
| CN | 1573492 A | 2/2005 |
| CN | 1920615 A | 2/2007 |
| TW | I259912 B | 8/2006 |

*Primary Examiner* — Chanh Nguyen
*Assistant Examiner* — Navin Lingaraju
(74) *Attorney, Agent, or Firm* — Dentons US LLP (57) ABSTRACT

A display device having multiple viewing zones includes a display panel including a plurality of pixels in a matrix form, each pixel including red, green and blue sub-pixels arranged in a vertical direction; and a light guide panel guiding a first image emitted from the pixels in first columns among the plurality of pixels to a first viewing zone and a second image emitted from the pixels in second columns among the plurality of pixels to a second viewing zone, wherein the first column is adjacent to the second column.

5 Claims, 11 Drawing Sheets

(56) References Cited

U.S. PATENT DOCUMENTS

| | | | |
|---|---|---|---|
| 6,198,467 B1* | 3/2001 | Chiang | 345/698 |
| 7,068,252 B2* | 6/2006 | Hattori et al. | 345/87 |
| 2002/0070909 A1* | 6/2002 | Asano et al. | 345/76 |
| 2004/0051724 A1* | 3/2004 | Elliott et al. | 345/694 |
| 2005/0007302 A1* | 1/2005 | Hattori et al. | 345/6 |
| 2006/0012593 A1* | 1/2006 | Iriguchi et al. | 345/204 |
| 2006/0139234 A1* | 6/2006 | Tanaka | 345/9 |
| 2007/0046564 A1* | 3/2007 | Kim et al. | 345/6 |
| 2007/0086090 A1* | 4/2007 | Wang et al. | 359/464 |
| 2007/0109329 A1* | 5/2007 | Roh et al. | 345/694 |
| 2007/0114907 A1* | 5/2007 | Chiang et al. | 313/483 |
| 2008/0030634 A1* | 2/2008 | Aramatsu | 349/15 |
| 2008/0074414 A1* | 3/2008 | Park et al. | 345/213 |
| 2008/0088935 A1* | 4/2008 | Daly | 359/613 |
| 2008/0316380 A1* | 12/2008 | Ijzerman et al. | 349/15 |
| 2009/0262418 A1* | 10/2009 | Yun et al. | 359/463 |

* cited by examiner

FIG. 2
RELATED ART image viewed at a first viewing zone(3*3)

image viewd at a second viewing zone(3*3)

FIG. 7 images displayed at a display panel(12*2)

images displayed at a display panel(6*3)
of the related art

FIG. 8A image viewed at a first viewing zone (6*2)

FIG. 8B image viewed at a second viewing zone (6*2)

DISPLAY DEVICE HAVING MULTIPLE VIEWING ZONES AND CONVERTING HORIZONTALLY-ARRANGED RGB SUBPIXEL DATA FOR OUTPUT ON SQUARE-SHAPED VERTICALLY-ARRANGED RGB SUBPIXELS

This application claims the benefit of Korean Patent Application No. 10-2007-0122787, filed in Korea on Nov. 29, 2007, which is hereby incorporated for all purposes as if fully set forth herein.

BACKGROUND OF THE INVENTION

1. Field of the Invention

The present invention relates to a display device having multiple viewing zones.

2. Discussion of the Related Art

Figure 1:
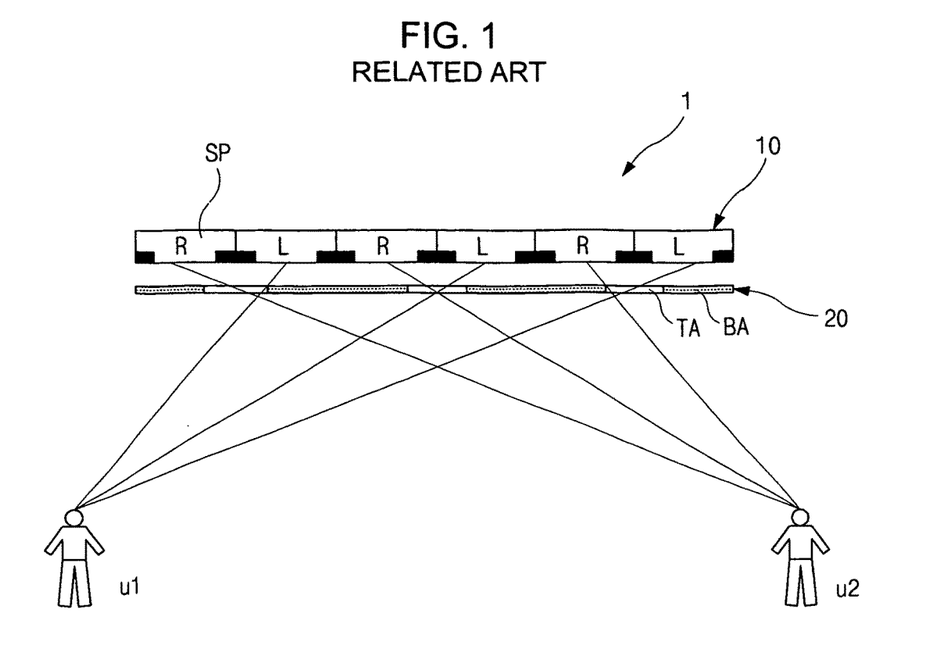
FIG. 1 is a schematic view illustrating a multi-view mode display device having dual viewing zones according to the related art.

In general, display devices display an image in common over viewing directions, and viewers watch the same image through the display device. This type of display device has disadvantage when viewers want to watch different images. Recently, a navigation device has had multiple functions such as a navigation mode, an image display mode, and the like. When the navigation mode is operated, one at a passenger seat who wants to watch like moving images could not do. Accordingly, recently, multi-view mode display devices, which can simultaneously display multiple images at multiple viewing zones, have been suggested to provide viewers with different images according to different viewing zones. FIG. 1 is a schematic view illustrating a multi-view mode display device having dual viewing zones according to the related art.

Referring to FIG. 1, the display device 1 according to the related art includes a display panel 10 and a parallax barrier 20. The display panel 10 includes a plurality of sub-pixels SP. The parallax barrier 20 includes a transmissive portion T and a blocking portion B arranged alternately in order that different sub-pixels SP are selectively viewed according to positions. Accordingly, viewers u1 and u2 at different viewing zones see different images.

The parallax barrier 20 selectively passes and blocks lights so that the left viewer u1 at a first viewing zone sees lights from sub-pixels SP displaying left image data L among lights from all sub-pixels SP while the right viewer u2 at a second viewing zone sees lights from sub-pixels SP displaying right image data R among lights from all sub-pixels SP.

An image displayed through the multi-view mode display device displaying multiple images has a resolution less than through an image displayed by a single view mode display device displaying an image in common. For example, the dual view mode display device is supplied with two original image data. Each original image data supplied have data amounts to be displayed through the single view mode display device. However, to simultaneously display dual images through the dual view mode display device, each original image data are sampled and have a data amount less than an original data amount, and the dual view mode display device displays the dual images with the two sampled image data. Accordingly, the viewer can not see some parts not sampled out of the original image, and resolution of the image viewed through the dual view mode display device is reduced.

Figure 2:
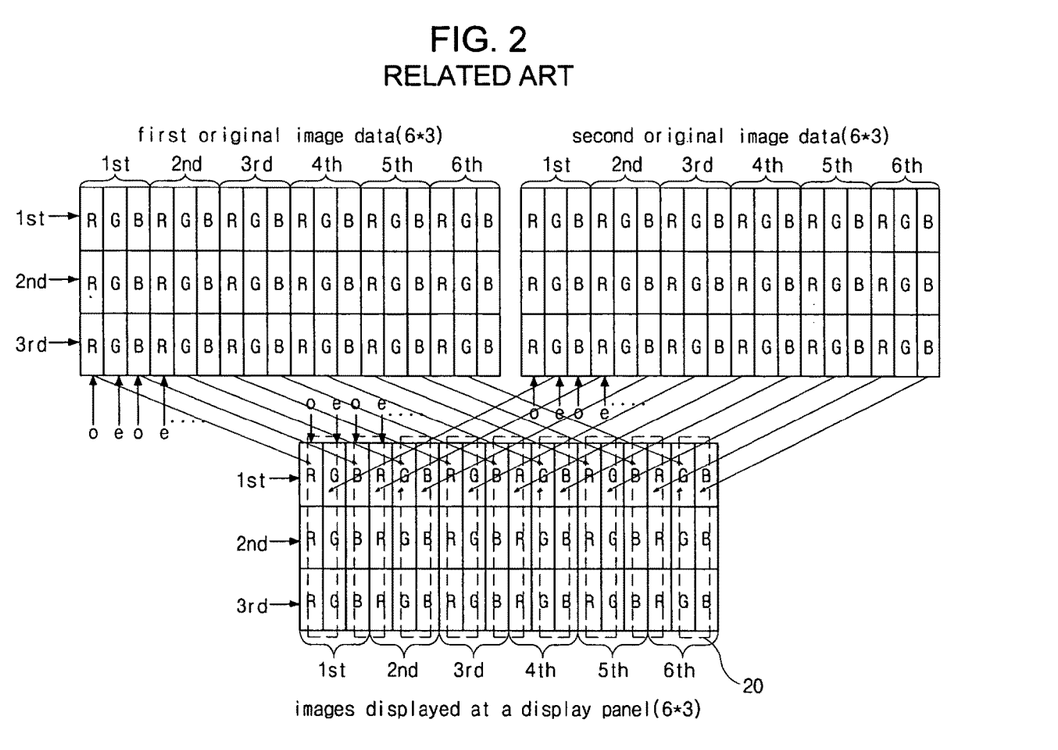
FIG. 2 is a view illustrating a method of inputting first and second original image data into a display panel of a dual view mode display device according to the related art.

FIG. 2 is a view illustrating a method of inputting first and second original image data into a display panel of a dual view mode display device according to the related art. In FIG. 2, each of the first and second original image data inputted to the display device is shown in a matrix form in view of mapping each of the first and second original image data into a single view mode display device. It is assumed that each of the first and second original image data have pixel image data of 6*3 in horizontal and vertical pixel resolutions, and the display panel has pixels of 6*3 in horizontal and vertical pixel resolutions and 18*3 in horizontal and vertical sub-pixel resolutions.

Referring to FIG. 2, the display panel (10 of FIG. 1) of the dual view mode the display device (1 of FIG. 1) includes a plurality of pixels arranged in horizontal and vertical directions. Each pixel includes red (R), green (G) and blue (B) sub-pixels arranged in a horizontal direction. Sub-pixels R, G or B having the same color are arranged in a vertical direction. The pixel has a square shape, and the sub-pixel has a rectangular shape having a ratio of width to length, 1:3.

The display panel has the same configuration of the pixels and sub-pixels as the configuration of each of the first and second original image pixel and sub-pixel data, the display panel should have image data sampled among each of the first and second original image data. For example, sub-pixels at odd (o) columns with respect to sub-pixel of the display panel are supplied with image data sampled among the first original image data for a first viewing zone. Further, sub-pixels at even (e) columns with respect to sub-pixel of the display panel are supplied with image data sampled among the second original image data for a second viewing zone.

Accordingly, half of each of the first original image data and the second original image data are selected and inputted to the corresponding sub-pixels. For example, image data at odd columns with respect to sub-pixel among the first original image data are selected and inputted to the sub-pixels at odd columns with respect to sub-pixel of the display panel while image data at even columns with respect to sub-pixel among the second original image data are selected and inputted to the sub-pixels at even columns with respect to sub-pixel of the display panel. Accordingly, the display panel simultaneously displays dual images through the sub-pixels at odd and even columns, respectively.

Figure 3A:
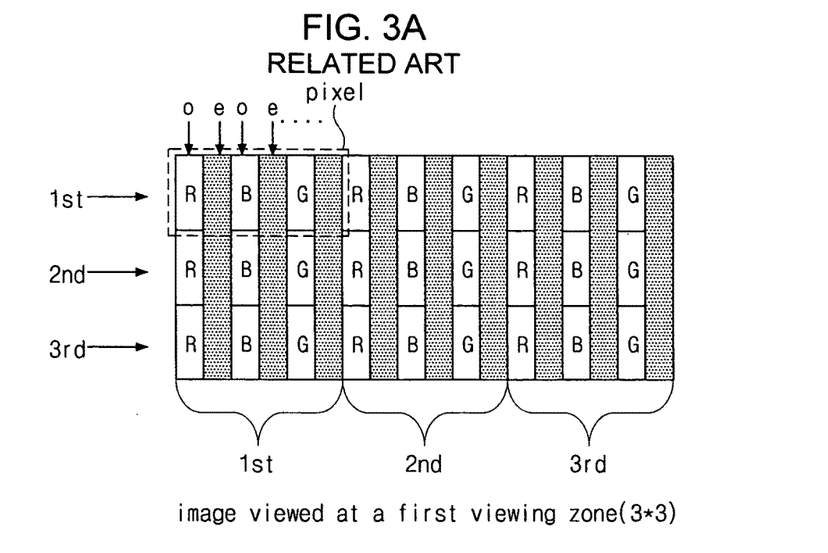
FIGS. 3A and 3B are views illustrating first and second images viewed at first and second viewing zones, respectively, using the display device according to the related art.
Figure 3B:
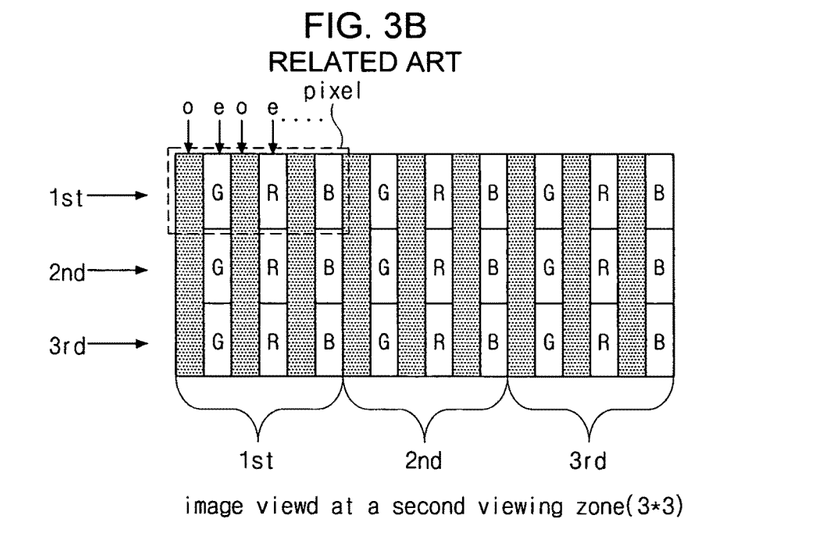

FIGS. 3A and 3B are views illustrating first and second images viewed at first and second viewing zones, respectively, using the display device according to the related art.

Referring to FIGS. 3A and 3B, since the parallax barrier (20 of FIG. 1) is located on the display panel, the sub-pixels at odd columns supplied with the sampled first original image data are viewed at the first viewing zone while the sub-pixels at even columns supplied with the sampled second original image data are viewed at the second viewing zone.

At each of the first and second viewing zones, one of adjacent two sub-pixels of the display panel is viewed. Accordingly, a pixel of an image viewed at each viewing zone seems to have an area occupied by six sub-pixels in a horizontal direction. Accordingly, a vertical resolution of the image viewed at each viewing zone is the same as the vertical resolution of the original image. However, a horizontal resolution of the image is half of the horizontal resolution of the original image. Accordingly, resolution of the image viewed at each viewing angle is reduced sharply. In other words, each of the first and second original images has a resolution of 6*3 while each of the images viewed at the first and second viewing zones has a resolution of 3*3. The horizontal resolution is reduced more as the display device has more viewing zones.

Figure 4:
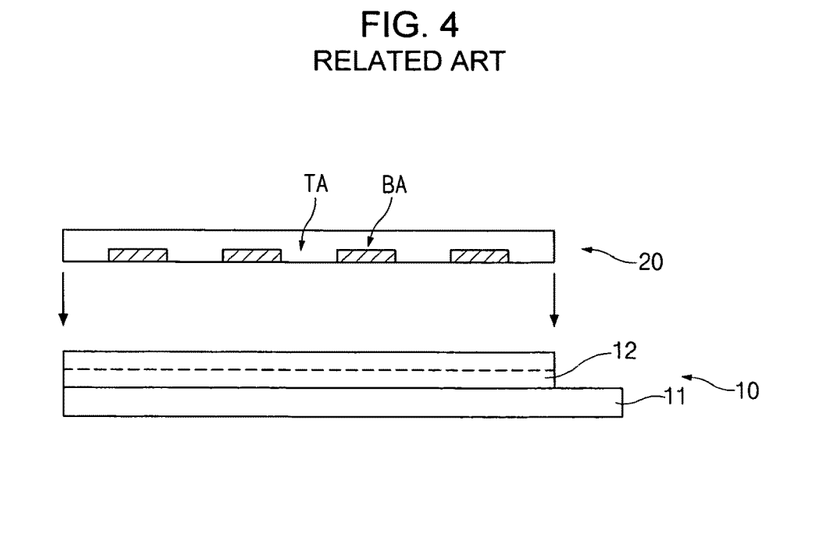
FIG. 4 is a view illustrating a method of attaching a parallax barrier to a display panel according to the related art.

FIG. 4 is a view illustrating a method of attaching a parallax barrier to a display panel according to the related art.

Referring to FIG. 4, a display panel 10 includes first and second substrates 11 and 12. A parallax barrier 20 is attached to the second substrate 12 of the display panel 10. To transmit multiple images to corresponding viewing zones, a predetermined thickness of the second substrate, which is a distance between the pixels of the display panel 10 and the parallax barrier 20, is required. The distance between the pixels and the parallax barrier 20 is proportional to a pitch i.e., a distance between sub-pixels in a horizontal direction for the same viewing zone. The pitch in the related art, for example, a distance by two sub-pixels as shown in FIG. 2 is very short. Accordingly, the short distance between the pixels and the parallax barrier 20 i.e, the small thickness of the second substrate 12 is required, and the second substrate 12 is required to be removed much. Further, as the display device have recently had the high definition, the second 12 is required to have the smaller thickness and to be removed more. However, since a process of removing the second substrate made of a material such as glass is very difficult, many problems occur as removing amount of the second substrate 12 increases. For example, when a polishing method is used to remove the top portion of the second substrate 12 shown as a dashed line in FIG. 4, uniformity of removing is reduced and the removed surface of the second substrate 12 is uneven. Accordingly, transmissive and blocking portions TA and BA of the parallax barrier 20 may be located at undesired position, and thus desired images may not be transmitted to the corresponding zones. Further, some portions are excessively removed, and thus holes sometimes occur.

Further, protruded portion of the first substrate 11, at which a pad portion connected to a driving circuit is located, has defect or loss during the removing process.

Further, since the remaining thickness of the second substrate 12 is very thin, a breakage of the second substrate 12 occurs when pressure is applied to attach the parallax barrier 20 to the display panel 10.

SUMMARY OF THE INVENTION

Accordingly, the present invention is directed to a display device having multiple viewing zones and a method of displaying multiple images that substantially obviate one or more of problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, according to an aspect of the present invention, a display device having multiple viewing zones includes a display panel including a plurality of pixels in a matrix form, each pixel including red, green and blue sub-pixels arranged in a vertical direction; and a light guide panel guiding a first image emitted from the pixels in first columns among the plurality of pixels to a first viewing zone and a second image emitted from the pixels in second columns among the plurality of pixels to a second viewing zone, wherein the first column is adjacent to the second column.

In another aspect of the present invention, a method of displaying multiple images to multiple viewing zones, respectively includes displaying first and second image data through a display panel including a plurality of pixels in a matrix form, each pixel including red, green and blue sub-pixels in the vertical direction, wherein the first image is displayed by the pixels in first columns among the plurality of pixels, the second image is displayed by the pixels in second columns among the plurality of pixels, and the first column is adjacent to the second column; and guiding the first image emitted from the pixels in the first columns to a first viewing zone and the second image emitted from the pixels in the second columns to a second viewing zone.

In another aspect of the present invention, a display device having multiple viewing zones includes: a display panel including a plurality of pixels in a matrix form, each pixel including a plurality of sub-pixels arranged along a first direction; and a light guide panel including a plurality of light guide portions having a plurality of light-guiding directions and arranged alternately along a second direction perpendicular to the first direction, each of the light guide portion is extended along the first direction.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, which are illustrated in the accompanying drawings.

Figure 5:
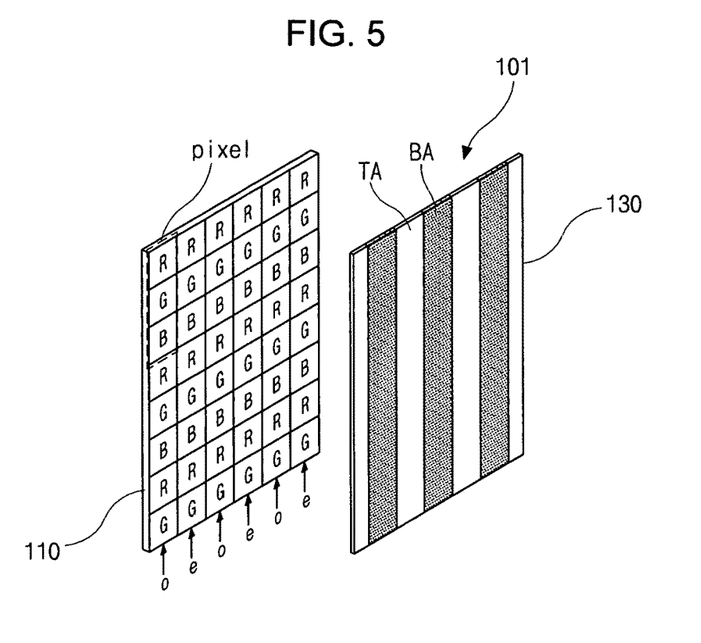
FIG. 5 is a view illustrating a multi-view mode display device having multi viewing zones according to an embodiment of the present invention.
Figure 6:
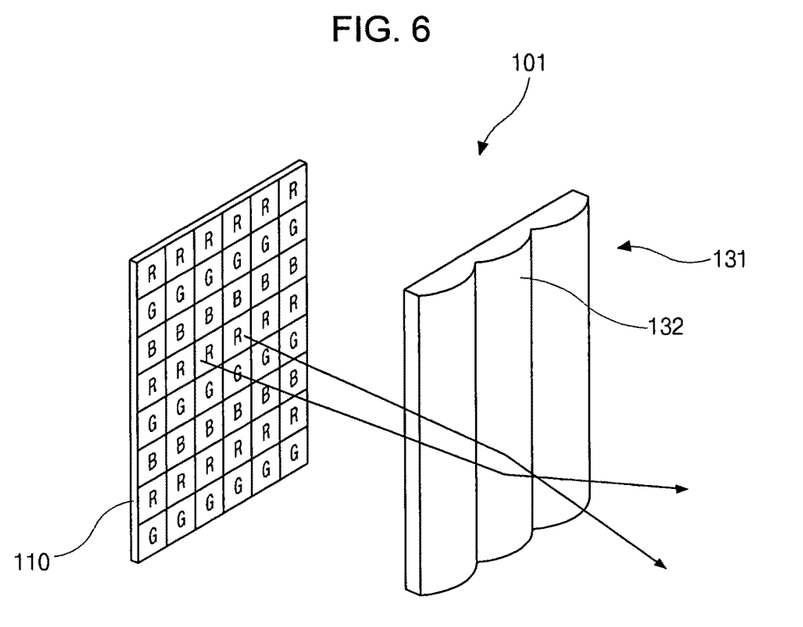
FIG. 6 is a view illustrating a lenticular-lens array used for a light guide panel according to the embodiment of the present invention.

FIG. 5 is a view illustrating a multi-view mode display device having multi viewing zones according to an embodiment of the present invention. FIG. 6 is a view illustrating a lenticular-lens array used for a light guide panel according to the embodiment of the present invention.

Referring to FIG. 5, the display device 101 may include a display panel 110 and a light guide panel. The display panel 110 includes a plurality of pixels in a matrix form. The pixel may include red (R), green (G) and blue (B) sub-pixels arranged along a vertical direction. The red (R), green (G) and blue (B) sub-pixels may be alternately arranged along each column. The sub-pixels displaying the same color may be arranged along each row.

The light guide panel may selectively guide lights to transmit multiple images to respective viewing zones. For example, when the display panel 110 simultaneously displays first and second images for first and second viewing zones, respectively, the light guide panel guides lights for the first image to the first viewing zone and guides lights for the second image to the second viewing zone.

To guide the lights to the corresponding viewing zones, the light guide panel may include a parallax barrier 130. The parallax barrier 130 may include a transmissive portion TA and a blocking portion BA arranged alternately. Each of the transmissive portion TA and blocking portion BA may be extended in a vertical direction. The parallax barrier 130 may be located on the display panel 110, for example, between the display panel 110 and viewers. The parallax barrier 130 functions to selectively pass and block lights emitted from the sub-pixels for viewers at different viewing zones to watch different images. For example, when the display device 101 displays dual images for dual viewing zones, the blocking portion BA overlaps adjacent odd and even sub-pixels, and viewers at a first viewing zone of the dual viewing zones see an image displayed by odd (o) sub-pixels while viewers at a second viewing zone of the dual viewing zones see an image displayed by even (e) sub-pixels.

Alternatively, referring to FIG. 6, the light guide panel may include a lenticular lens array 131 to guide lights. The lenticular lens array 131 includes a plurality of convex lens 132, and the convex lens may be extended in a vertical direction. The convex lens 132 functions to selectively refract lights emitted from the sub-pixels for viewers at different viewing zones to watch different images. For example, when the display panel 110 displays dual images for dual viewing zones, the lenticular lens refracts lights emitted from odd (o) sub-pixels differently from lights emitted from even (e) sub-pixels, and viewers at a first viewing zone of the dual viewing zones see an image displayed by odd sub-pixels while viewers at a second viewing zone of the dual viewing zones see image displayed by even (e) sub-pixels.

The display panel 110 may include various types of flat display panels, for example, a liquid crystal panel, an organic electroluminescent display panel and the like. When the display panel 110 is the liquid crystal panel, a light source such as backlight unit may be used to supply light to the liquid crystal panel. When the liquid crystal panel is used for the display panel 110, the liquid crystal panel may include first and second substrates and a liquid crystal layer between the first and second substrates. The first substrate may include a plurality of gate and data lines crossing each other to define a plurality of sub-pixel regions, a plurality of thin film transistors connected to the gate and data lines, and a plurality of pixel electrodes at the sub-pixel regions, and the second substrate may include red, green and blue color filters corresponding to the respective sub-pixel regions, and a common electrode. This configuration may be employed for a TN (Twisted Nematic) mode liquid crystal panel. Alternatively, other types of liquid crystal panels may be used, for example, an IPS (in-plane switching) mode liquid crystal panel, a VA (vertical alignment) mode liquid crystal panel and the like.

Each sub-pixel of the display panel 110 may have a square shape, and each pixel including the square-shaped red (R), green (G) and blue (B) sub-pixels may be longer in a vertical direction than in a horizontal direction. When the liquid crystal panel is used, each of the red, green and blue color filters may be extended along a horizontal direction. For example, the red color filter is extended over the red (R) sub-pixels in the corresponding row.

Figure 7:
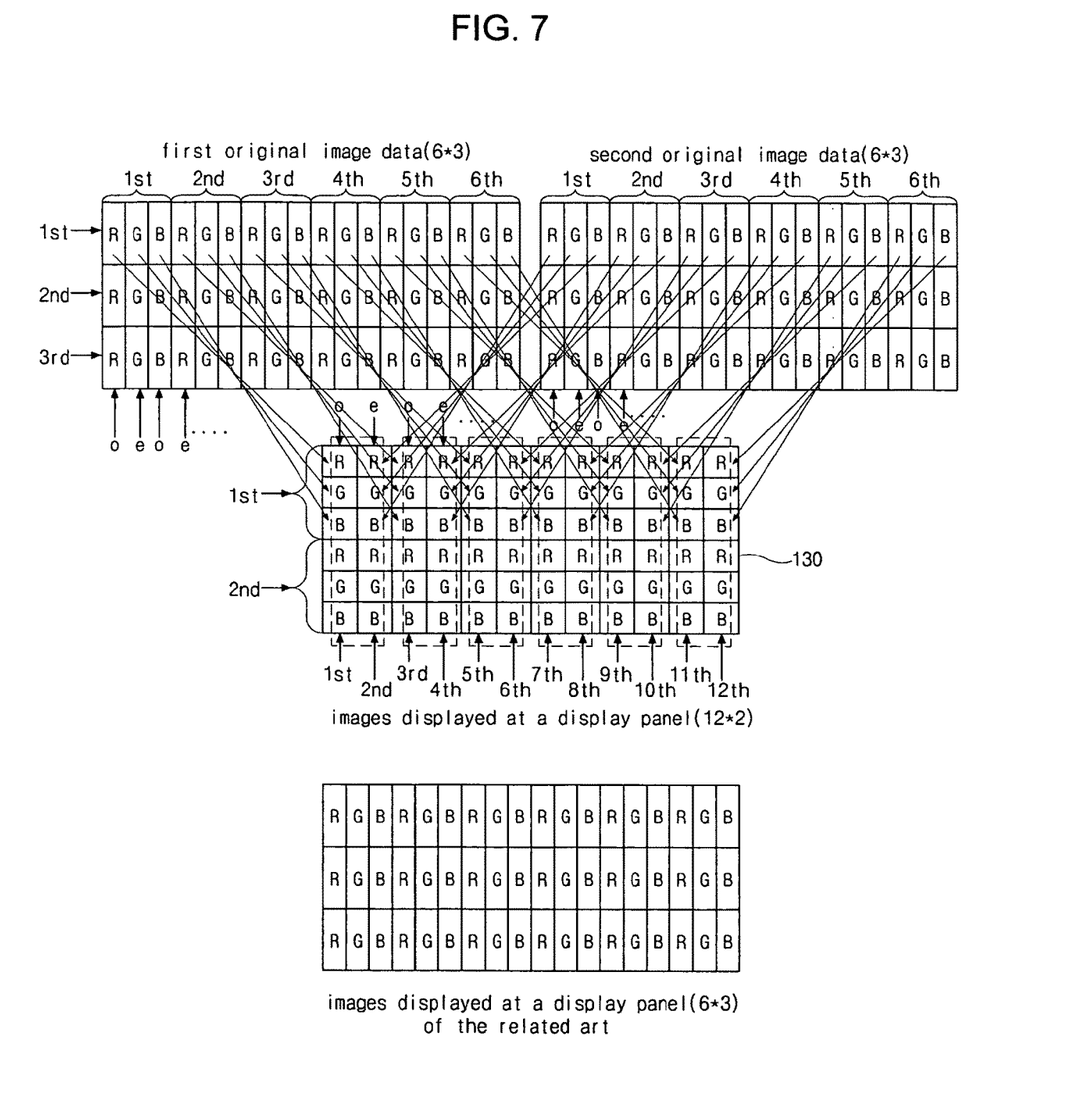
FIG. 7 is a view illustrating a method of inputting first and second original image data into a display panel of a dual view mode display device according to the embodiment of the present invention.

FIG. 7 is a view illustrating a method of inputting first and second original image data into a display panel of a dual view mode display device according to the embodiment of the present invention. In FIG. 7, each of the first and second original image data inputted to the display device is shown in a matrix form in view of mapping each of the first and second original image data into a single view mode display device. It is assumed that each of the first and second original image data have pixel image data of 6*3 in horizontal and vertical pixel resolutions, and the display panel has pixels of 12*2 in horizontal and vertical pixel resolutions and 12*6 in horizontal and vertical sub-pixel resolutions. Further, it is assumed that the display panel substantially has the same area as the display panel of FIG. 2 at the bottom portion of FIG. 7.

Referring to FIG. 7, each sub-pixel of the display panel (110 of FIG. 5) may have a square shape, and each pixel may include the square-shaped red (R), green (G) and blue (B) sub-pixels. A width of the sub-pixel may be one and an half of a width of the sub-pixel of the related art, and a length of the sub-pixel may be an half of a length of the sub-pixel of the related art. Accordingly, a width of the pixel may be an half of a width of the pixel of the related art, and a length of the pixel may be one and an half of a length of the pixel. Accordingly, a horizontal resolution (i.e., a horizontal pixel resolution) of the display panel may be twice of a horizontal resolution of the display panel of the related art, and a vertical resolution (i.e., a vertical pixel resolution) of the display panel may be two thirds of a vertical resolution of the display panel of the related art.

Since the horizontal resolution of the display panel increases to twice of the horizontal resolution of the display panel of the related art, the image along a horizontal direction at each of the first and second viewing zones can have the same horizontal resolution as the original image, and thus reduction of the horizontal resolution at each viewing zone does not occur. For example, image data for pixels at a first row and all columns of the first original image data correspond to pixels at a first row with respect to pixel and odd (o) columns, and image data for pixels at a first row and all columns of the second original image data correspond to sub-pixels at a first row with respect to pixel and even (e) columns. Accordingly, first and second images viewed at first and second viewing zones have the same horizontal resolution as the first and second original images, respectively.

With respect to the vertical resolution, the display panel has two thirds of the vertical resolution of the display panel of the related art. Accordingly, when the original image data are inputted to the display panel in a one-to-one mapping manner, some of the original image data could not be inputted and be lost. To prevent this, data interpolation method may be used. For example, average value of two original image data of adjacent two pixels at first and second rows is inputted to the pixel at a first row with respect to pixel of the display panel, and average value of two original image data of adjacent two pixels at second and third rows is inputted to the pixel at a second row with respect to pixel of the display panel. That is, average value of each of two original red image data, two original green image data and two original blue image data of adjacent two pixels at first and second rows is inputted to each of red (R), green (G) and blue (B) sub-pixels of the pixel at a first row with respect to pixel of the display panel. Accordingly, image loss due to the reduction of the vertical resolution of the display panel can be minimized.

Figure 8A:
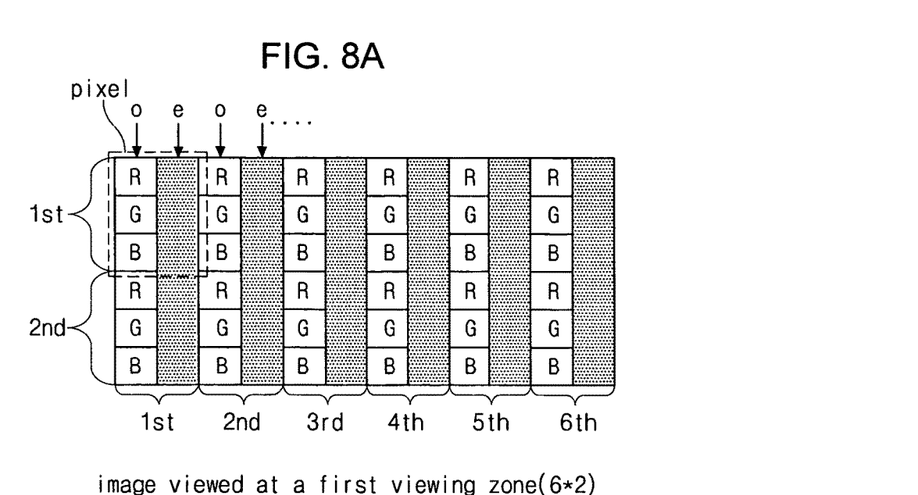
FIGS. 8A and 8B are views illustrating first and second images viewed at first and second viewing zones, respectively, using the display device according to the embodiment of the present invention.
Figure 8B:
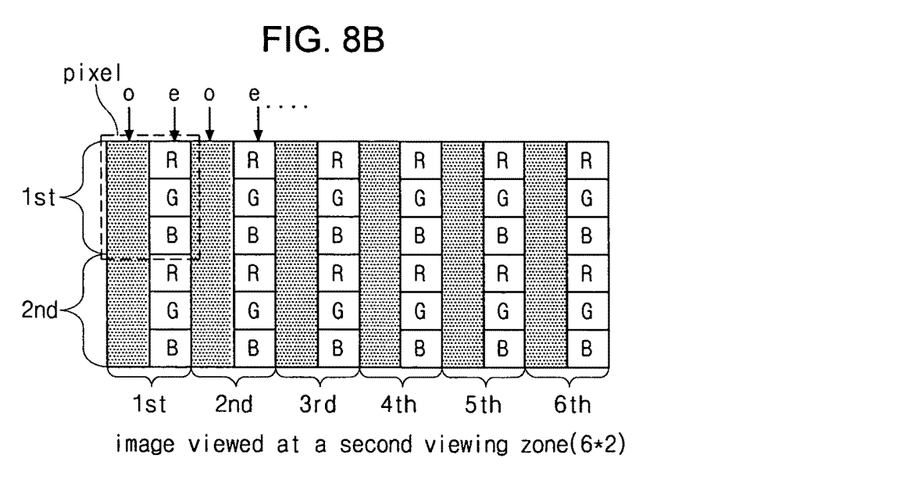

FIGS. 8A and 8B are views illustrating first and second images viewed at first and second viewing zones, respectively, using the display device according to the embodiment of the present invention.

Referring to FIGS. 8A and 8B, sub-pixels at odd (o) columns of the display panel (of FIG. 5) are viewed at a first viewing zone to display a first image while sub-pixels of the display panel at even (e) columns are viewed at a second viewing zone to display a second image.

For the first and second images displayed at the first and second viewing zones, one pixel seems to have an area occupied by three sub-pixels in a vertical direction and two sub-pixels in a horizontal direction. The sub-pixels having the same color along a horizontal direction in each of the first and second images may be spaced by a distance of two sub-pixels. However, the sub-pixels having the same color along a horizontal direction in each of the first and second images in the related art, as shown FIGS. 3A and 3B, are spaced by a distance of five sub-pixels. Accordingly, viewers feel that the image viewed is denser than the image viewed in the related art, and thus emotional resolution, which viewers feel emotionally, can increase. Even though the vertical resolution of each image is reduced, it can be minimized using a data interpolation method, as explained above. Further, since the horizontal resolution of each image is the same as each original image, overall resolution of the image increases by 33.3 (=(2*(⅔)−1)*100)) percentages compared to overall resolution of the image in the related art.

Pictures were taken to compare the dual view mode display device according to the related art with the dual view mode display device according to the embodiment of the present invention. For example, a picture having objects and characters viewed at a viewing zone through the dual view mode display device according to the related art, a picture having a single color of red, green and blue viewed at a viewing zone through the dual view mode display device according to the related art, a picture having objects and characters viewed at a viewing zone through the dual view mode display device according to the embodiment of the present invention, and a picture having a single color of red, green and blue viewed at a viewing zone through the dual view mode display device according to the embodiment of the present invention were obtained.

Objects and characters in the picture made by the dual view mode display device according to the embodiment of the present invention are visible more than those in the picture made by the dual view mode display device according to the related art. Accordingly, the image of the dual view mode display device according to the embodiment of the present invention has visibility and resolution better than the image of the dual view mode display device according to the related art.

A single color in the picture made by the dual view mode display device according to the related art is clear without discontinuity along a vertical direction while the single color is spaced far away in a horizontal direction, and thus difference between the vertical resolution and horizontal resolution is large. Accordingly, viewers feel that there are stripe lines along a vertical direction and spaced far away along a horizontal direction, and thus visibility is reduced. However, viewers feels that a single color in the picture made by the dual view mode display device according to the embodiment of the present invention is displayed smoothly all over the image more than the single color in the picture made by the dual view mode display device according to the related art since a distance between adjacent sub-pixels having the same color along a horizontal direction is denser than that in the related art and the sub-pixels having the same color are spread evenly all over the image more than those in the related art. Since the single color is perceived to be spread evenly over the image compared to that the single color is perceived to have the stripe lines over the image in the related, viewers feels that the desired color is transmitted well to them.

Further, a pitch i.e., a distance between adjacent two sub-pixels for each of the first and second viewing zones is larger than that in the related art. For example, since a width of the sub-pixel has one and an half of a width of the sub-pixel in the related art, a distance between adjacent two sub-pixels has one and an half of that in the related art. Accordingly, a substrate attached to the light guide panel such as the parallax barrier and the lenticular lens array can be removed less than that in the related art. Accordingly, uniformity of the substrate surface removed can be improved, and the substrate breakage and defect or loss of a pad portion of the display panel can be reduced. Accordingly, product efficiency can be improved.

Figure 9A:
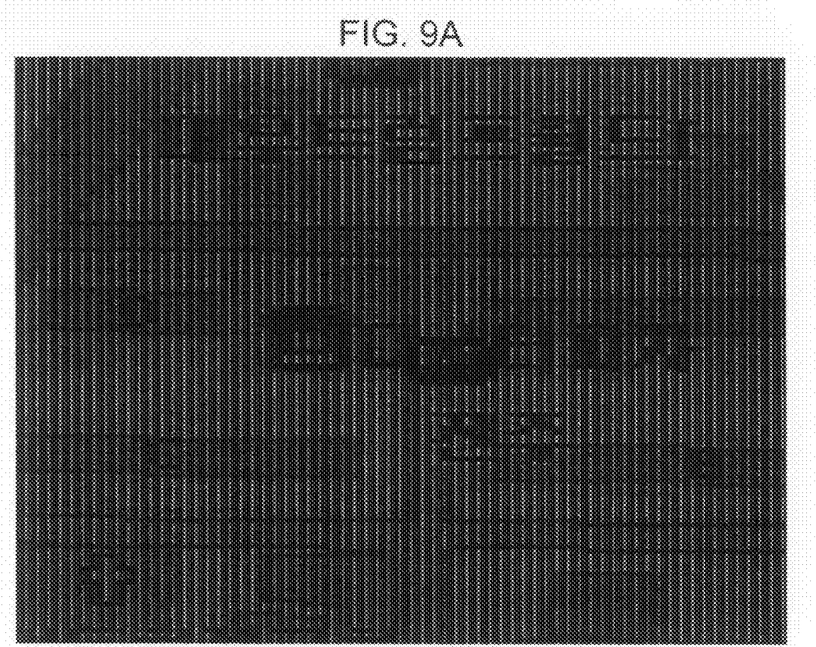
FIG. 9 is a view illustrating a triple view mode display device according to another embodiment of the present invention.
Figure 9B:
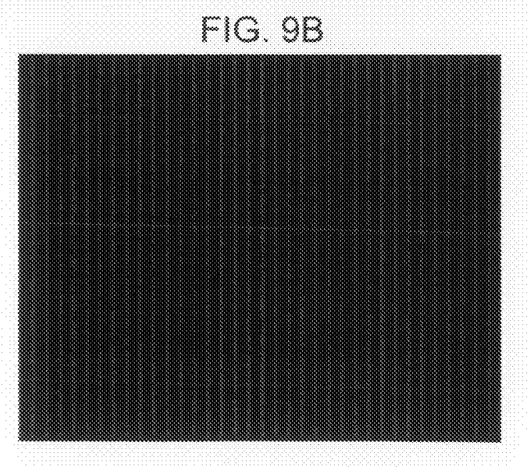
Figure 10A:
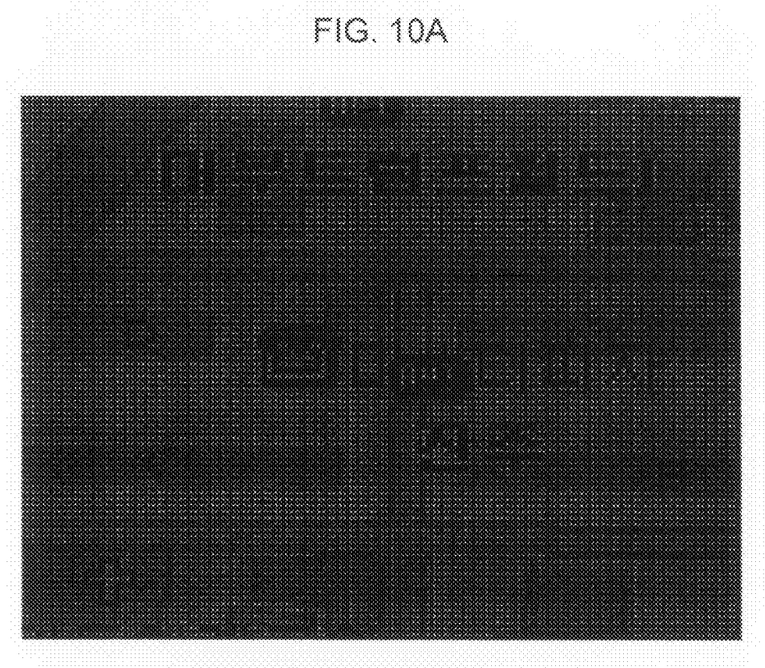
Figure 10B:
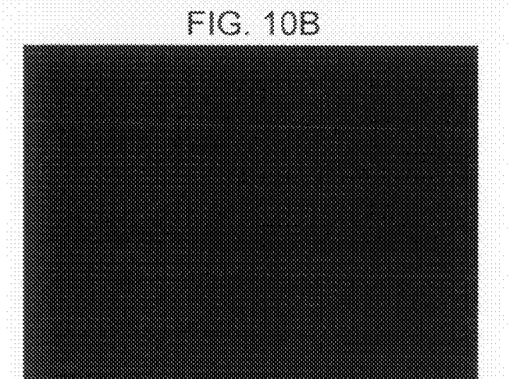
Figure 11:
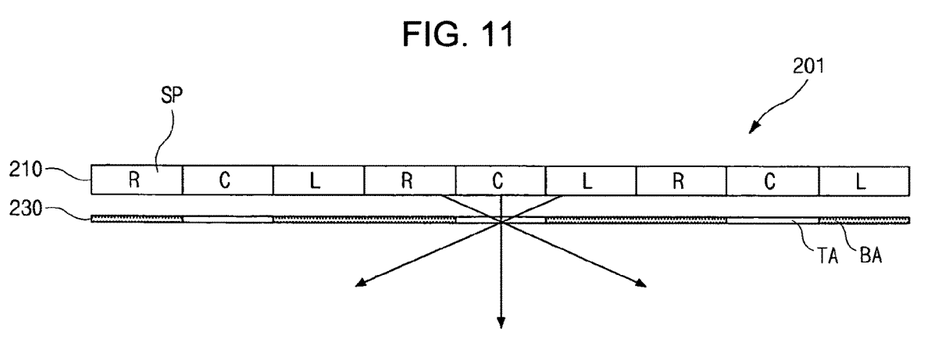

FIG. 9 is a view illustrating a triple view mode display device according to another embodiment of the present invention.

Referring to FIG. 9, a triple view mode display device 201 as one of a multi-view mode display devices includes three sub-pixels SP in a display panel 210 displaying three image data to three viewing zones. For example, viewers at a first viewing zone see lights from sub-pixels SP displaying left image data L among lights from all sub-pixels SP, viewers at a second viewing zone see lights from sub-pixels SP displaying right image data R among lights from all sub-pixels SP, and viewers at a third viewing zone see lights from sub-pixels SP displaying center image data C among lights from all sub-pixels SP.

In a similar manner to configuration of FIG. 5, a pixel may include red, green and blue sub-pixels SP arranged in a vertical direction, the red, green and blue sub-pixels SP may be alternately arranged along each column. The sub-pixels SP displaying the same color may be arranged along each row. The pixel for the left viewing zone, the pixel for the center viewing zone, and the pixel for the right viewing zone may be arranged alternately.

A parallax barrier 230 as a light guide panel includes a transmissive portion TA and a blocking portion BA arranged alternately. The transmissive portion TA and the blocking portion BA are extended along a vertical direction. The blocking portion BA may cover the sub-pixels SP for the left and right viewing zones and overlap the sub-pixel SP for the center viewing zone to transmit three images to the corresponding viewing zones.

Alternatively, a lenticular lens array may be used for the light guide panel.

The configuration of the display device as explained in the above-mentioned embodiments can be employed to display devices having more than tripe viewing zones.

It will be apparent to those skilled in the art that various modifications and variations can be made in the display device and a method of displaying an image of embodiments of the invention without departing from the spirit or scope of the invention. Thus, it is intended that embodiments of the invention cover the modifications and variations of this invention provided they come within the scope of the appended claims and their equivalents.

What is claimed is:

1. A display device having multiple viewing zones, comprising:

a display panel including a plurality of pixels in a matrix form, each pixel including red, green, and blue sub-pixels arranged in a vertical direction, wherein each of the red, the green and the blue sub-pixels has a square shape to increase a pitch between adjacent sub-pixels and increase a distance between the display panel and a light guide panel and is arranged in a horizontal line with no intervening space between sub-pixels of a same color, and each pixel is longer in the vertical direction than in the horizontal direction; and the light guide panel guiding a first image emitted from the pixels in first columns among the plurality of pixels to a first viewing zone and a second image emitted from the pixels in second columns among the plurality of pixels to a second viewing zone, wherein the first column is adjacent to the second column, wherein a first original image data including first red, green, and blue sub-pixel image data is arranged in a horizontal direction and a second original image data including second red, green, and blue sub-pixel image data is arranged in the horizontal direction, wherein the first and second original image data are input to the display panel, wherein average values of the first red, green and blue sub-pixel image data at the first and second rows and the first to third columns of the first original image data are applied to the red, green and blue sub-pixels at a first row with respect to pixel and the first column among the plurality of pixels, respectively, and average values of the second red, green and blue sub-pixel image data at the first and second rows and the first to third columns of the second original image data are applied to the red, green and blue sub-pixels at the first row with respect to pixel and the second column among the plurality of pixels, respectively, and wherein average values of the first red, green, and blue sub-pixel image data at the second and third rows and the first to third columns of the first original image data are applied to the red, green, and blue sub-pixels at a second row with respect to pixel and the first column among the plurality of pixels, respectively, and average values of the second red, green, and blue sub-pixel image data at the second and third rows and the first to third columns of the second original image data are applied to the red, green, and blue sub-pixels at the second row with respect to pixel and the second column among the plurality of pixels, respectively.

2. The device according to claim 1, wherein the light guide panel guides a third image emitted from the pixels in third columns among the plurality of pixel to a third viewing zone, and the third column is adjacent to one of the first and second columns.

3. The device according to claim 1, wherein the light guide panel includes a parallax barrier including a transmissive portion and a blocking portion alternately arranged in the horizontal direction.

4. The device according to claim 1, wherein the display panel includes one of an organic electroluminescent panel, and a liquid crystal panel and a light source supplying light to the liquid crystal panel.

5. The device according to claim 1, wherein each of sub-pixel image data has a rectangular shape.

* * * * *